(12) United States Patent
Cucerzan et al.

(10) Patent No.: US 7,974,964 B2
(45) Date of Patent: Jul. 5, 2011

(54) CONTEXT BASED SEARCH AND DOCUMENT RETRIEVAL

(75) Inventors: Silviu P. Cucerzan, Redmond, WA (US); Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 11/654,324

(22) Filed: Jan. 17, 2007

(65) Prior Publication Data

US 2008/0172364 A1 Jul. 17, 2008

(51) Int. Cl.
*G06F 17/30* (2006.01)
(52) U.S. Cl. ....................................... 707/706
(58) Field of Classification Search .................. 707/705, 707/706, 999.005
See application file for complete search history.

(56) References Cited

U.S. PATENT DOCUMENTS

| | | | |
|---|---|---|---|
| 6,240,412 B1 | 5/2001 | Dyko et al. ........................ 707/5 |
| 6,304,259 B1 | 10/2001 | DeStefano ..................... 345/346 |
| 6,490,579 B1 | 12/2002 | Gao et al. ........................... 707/4 |
| 6,693,651 B2 | 2/2004 | Biebesheimer et al. ....... 345/837 |
| 6,725,227 B1 * | 4/2004 | Li .................................. 707/102 |
| 6,920,459 B2 | 7/2005 | Dedhia et al. ................. 707/102 |
| 6,976,017 B1 | 12/2005 | Getchius ............................ 707/3 |
| 7,167,901 B1 * | 1/2007 | Beadle et al. .................. 709/207 |
| 7,295,995 B1 * | 11/2007 | York et al. ........................ 705/26 |
| 7,409,383 B1 * | 8/2008 | Tong et al. .......................... 707/3 |
| 7,603,349 B1 * | 10/2009 | Kraft et al. ............................ 1/1 |
| 2002/0055894 A1 | 5/2002 | Hyder .............................. 705/30 |
| 2005/0132269 A1 | 6/2005 | Chakraborty .................. 715/513 |
| 2005/0187920 A1 | 8/2005 | Tenembaum et al. ............. 707/3 |
| 2006/0036659 A1 | 2/2006 | Capriati et al. ................ 707/304 |
| 2006/0224565 A1 | 10/2006 | Ashutosh et al. .................. 707/3 |
| 2008/0059418 A1 * | 3/2008 | Barsness et al. ................... 707/2 |
| 2008/0154912 A1 * | 6/2008 | Weber et al. ..................... 707/10 |

OTHER PUBLICATIONS

"Hyperstructure-Based Search Methods for the World Wide Web", Zhanzi Qiu, 2004, D17, Darmstafter Dissertation, 188 pages, translation, http://deposit.ddb.de/cgi-bin/dokserv?idn=970952821 &dok_var=d1&dok_ext=pdf&filename=970952821.pdf.
"Exploiting Rich Context: An Incremental Approach to Context-Based Web Search", Leake et al., Computer Science Department, Indiana University, 14 pages, http://www.cs.indiana.edu/~treichhe/context05.pdf, prior to Jan. 17, 2007.
"ConSearch: Using Hypertext Contexts as Web Search Boundaries", Zhanzi Qiu et al., GMD-IPSI, Darmstadt, Germany, 12 pages, http://www.informatik.fernuni-hagen.de/ia/de/staff/hemmje/publications/2000/Papers/COOPIS_2000/CoopIS_2000.pdf, prior to Jan. 17, 2007.

(Continued)

*Primary Examiner* — Debbie Le
(74) *Attorney, Agent, or Firm* — Christopher J. Volkmann; Westman, Champlin & Kelly, P.A.

(57) ABSTRACT

A context based search and document retrieval application is disclosed. The application uses context data that is generated by a document analysis component based upon context information from various sources, including for example, document collections available on the world wide web. The context data is provided to a search query generator. The search query generator is configured to generate a contextually annotated search query based upon a user query and context data. Bookmarks having an associated context are generated for documents retrieved in response to the contextually annotated search query. The application then provides access to the bookmarked documents when the user is browsing other documents with similar contexts to the context of the original document for which the context based search was executed and the bookmark created. The bookmarked documents are hyperlinked to terms in the browsed document.

20 Claims, 9 Drawing Sheets

OTHER PUBLICATIONS

"A Web-Based Process and Process Models to Find and Deliver Information to Improve the Quality of Flight Software", J. Scott Hawker et al., University of Alabama, Tuscaloosa, Alabama, 11 pages, 2003, http://cs.ua.edu/SEL/Publications/Standards_Advisor/Web_Based_Process_and_Process_models-DASC_2003.pdf.

"Notification of Transmittal of the International Search Report and The Written Opinion of the International Searching Authority, or the Declaration" for PCT/US2008/051375 filed Jan. 17, 2008; 12 pages.

* cited by examiner

CONTEXT BASED SEARCH AND DOCUMENT RETRIEVAL

BACKGROUND

Program applications, such as browsers include methods and functions to browse or edit documents, such as web pages retrieved from the World Wide Web ("web"). Often times a user may want to retrieve additional information or documents related to a particular subject or topic in the document that the user is browsing. To retrieve additional information pertaining to a particular subject, the user may invoke a new browser frame or application to search for supplemental documents or information for the particular topic or subject area of interest.

The user then enters a search query to retrieve documents related to the particular subject of interest. Typical search engines retrieve documents that contain all of the search query terms; thus, when a query contains many terms, relevant documents may be missed because they do not contain one of the queried terms (instead, they may contain a synonym or a different inflection of the term). Because of this and also because of the effort involved in typing, users tend to write very short queries (i.e. containing very few terms). Unfortunately, such queries do not include sufficient context details and tend to be highly ambiguous. Consequently, many irrelevant documents are retrieved. For example, while reading an article about the Space station repairs, a user may attempt to find out more about the heat shield mentioned in the article by sending the query "heat shield" to a web search engine. Because the query is ambiguous, it may happen that none of the top results for this two-word is relevant to the user's informational need in the current context, as these results discuss roofing and house thermal insulation.

After refining the query or examining many search results, the user may find a relevant document. On one hand, if the user does not bookmark the document, it is difficult for the user to remember the source of the document should the user desire to review the document again in relation to the particular subject area or topic. On the other hand, users do not want to create very many bookmarks because this would make the process of finding any particular bookmark very difficult.

The discussion above is merely provided for general background information and is not intended to be used as an aid in determining the scope of the claimed subject matter.

SUMMARY

The application relates to a context based search and document retrieval application which invokes a document analysis component to generate context data for a document such as a web page. The context data is provided to a search query generator, which is configured to generate a contextually annotated search query based on a user query and the context of the original document examined by the user. In embodiments described, the application also enables contextual bookmarking of one or more of the documents retrieved in response to the contextually annotated search query. The application then provides access to the bookmarked documents for other documents with similar contexts to the context of the original document and can automatically hyperlink them to terms in these other documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
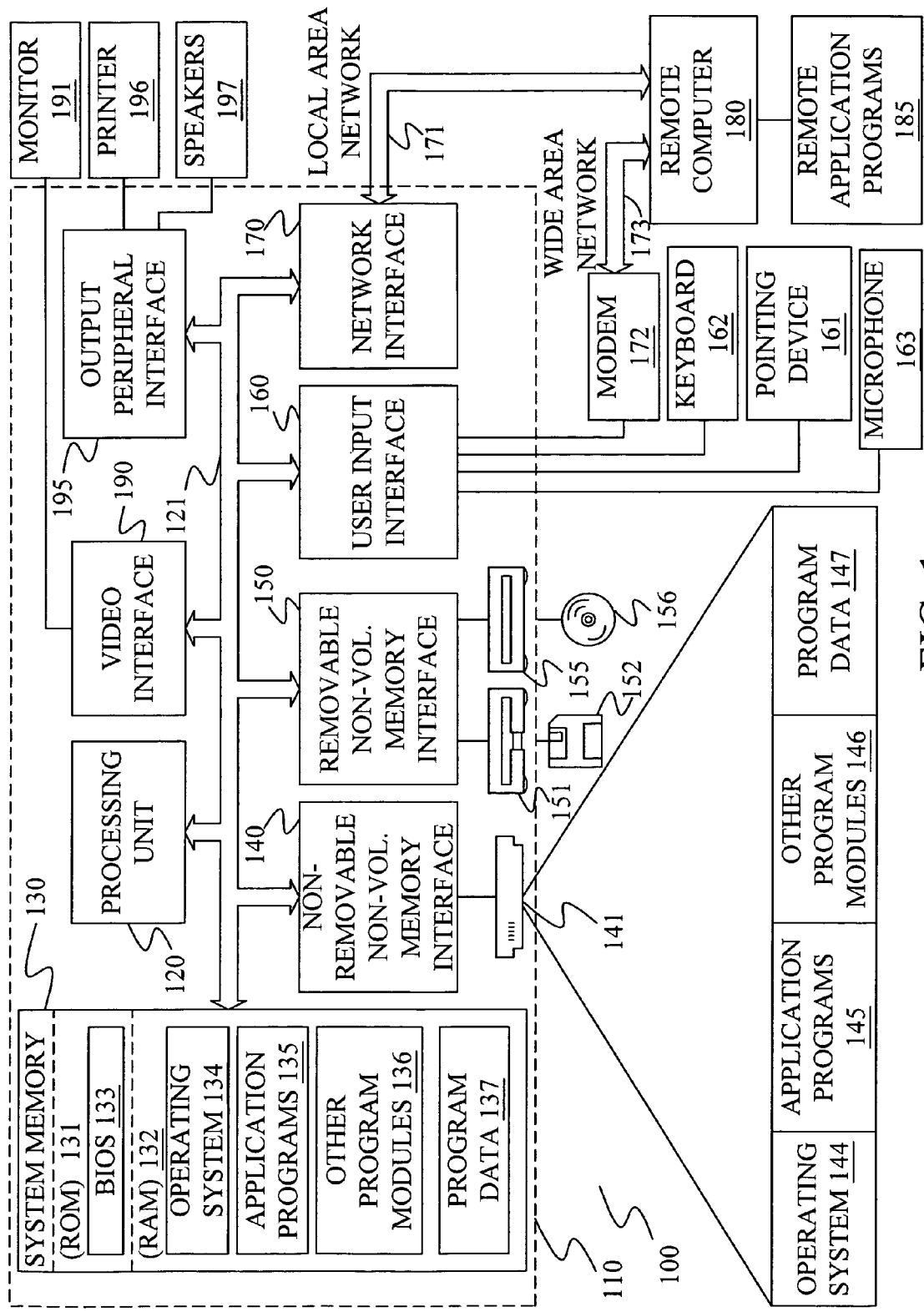
FIG. 1 is a block diagram of one illustrative environment in which the present invention can be used.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used. Although FIG. 1 includes an illustrative environment, application is not limited to the illustrated environment.

Figure 2:
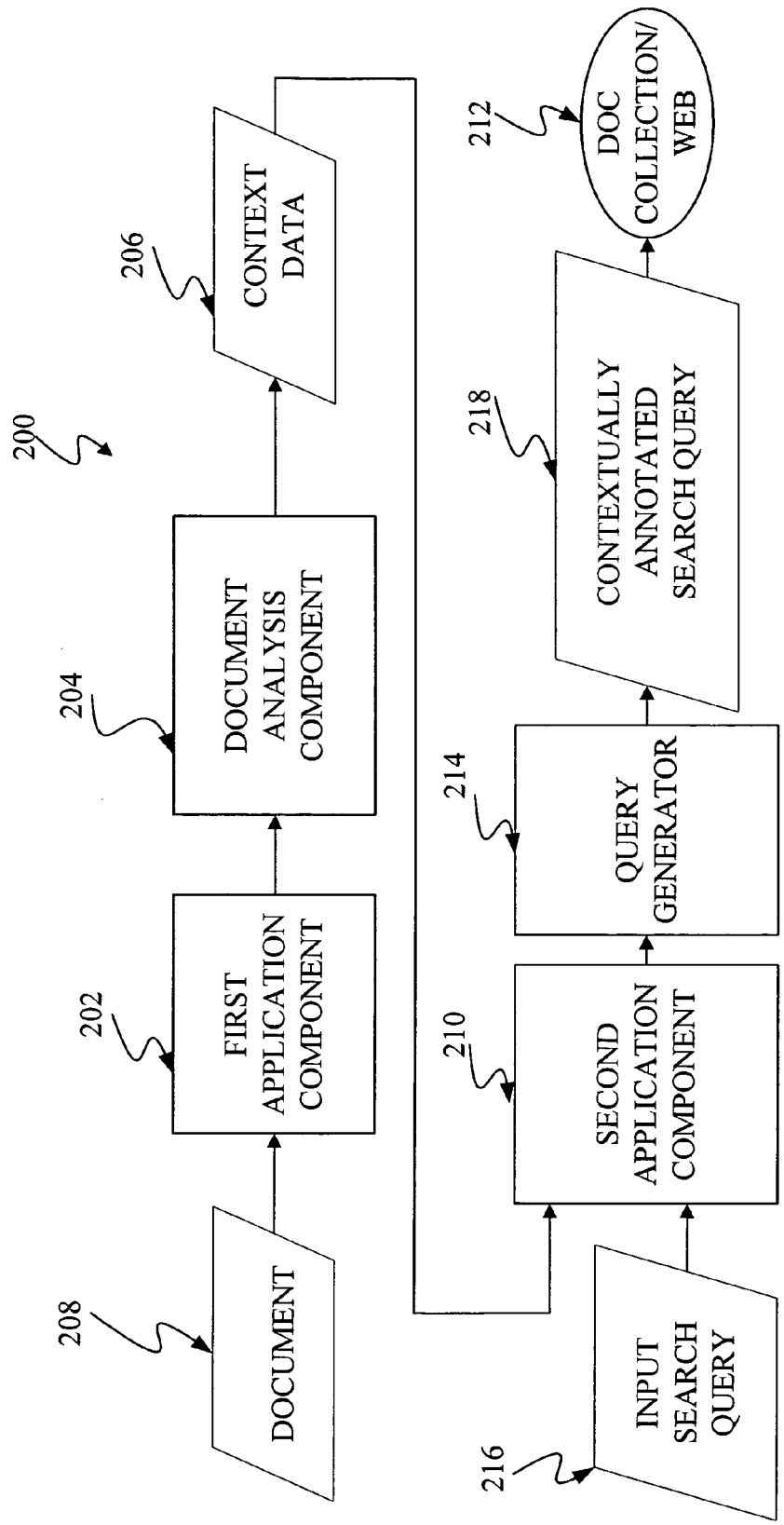
FIG. 2 is an illustration of an embodiment of an application including a query generator to generate a contextually annotated search query based upon context data for a document.

FIG. 2 illustrates an embodiment of an application or system 200 that uses context data to search and retrieve documents from a document collection or web. As shown in FIG. 2, the application 200 includes a first application component 202 which invokes a document analysis component 204 to generate context data 206 for a document 208. The document can be any of a web page, a text document stored on a local computer, or a text document stored on another accessible computer; and is not limited to a particular document type. Examples of documents are news stories, academic papers, movie reviews, etc. The generated context data 206 includes document context data and/or context data for entities and terms in the document. The context data 206 is available to and used by a second application component 210 to retrieve documents or information from a document collection or the web 212.

As shown, the second application component 210 invokes a context search query generator 214 which receives input context data 206, including document context data, generated by the document analysis component 204 and a user's input search query 216. The context search query generator 214 uses the context data 206 and the input search query 216 to generate a contextually annotated search query 218 to retrieve additional documents or information based upon the context of the original document. The contextually annotated search query 218 includes additional search terms to focus a search based upon the context of the original document.

Figure 3:
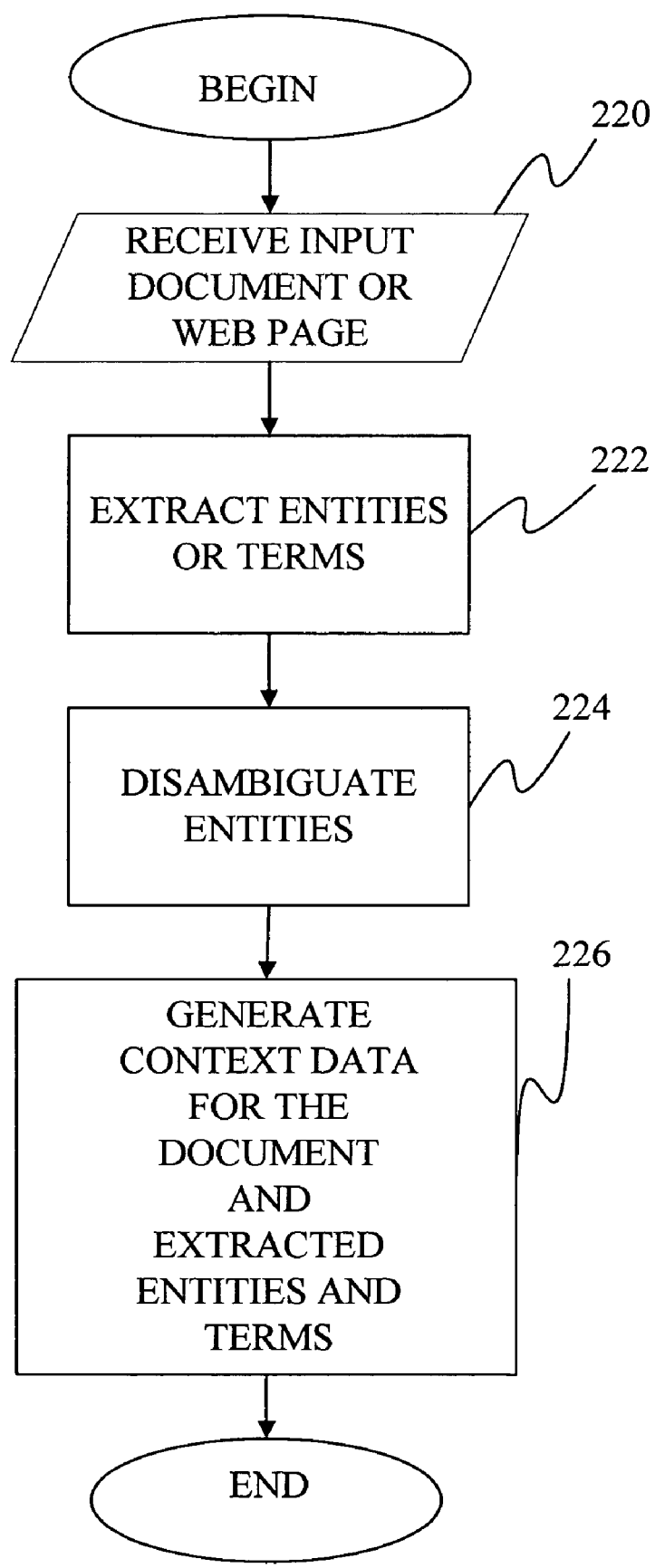
FIG. 3 is a flow chart illustrating steps for analyzing a document and generating context data for the document.

FIG. 3 illustrates steps for generating context data 206 for the input document 208. In step 220, the input document is received and in step 222, entities and terms are extracted from the document 208. In step 224, ambiguous terms or entities are disambiguated based upon the context of the document. In step 226, context data is generated for the document and extracted entities and terms.

Figure 4:
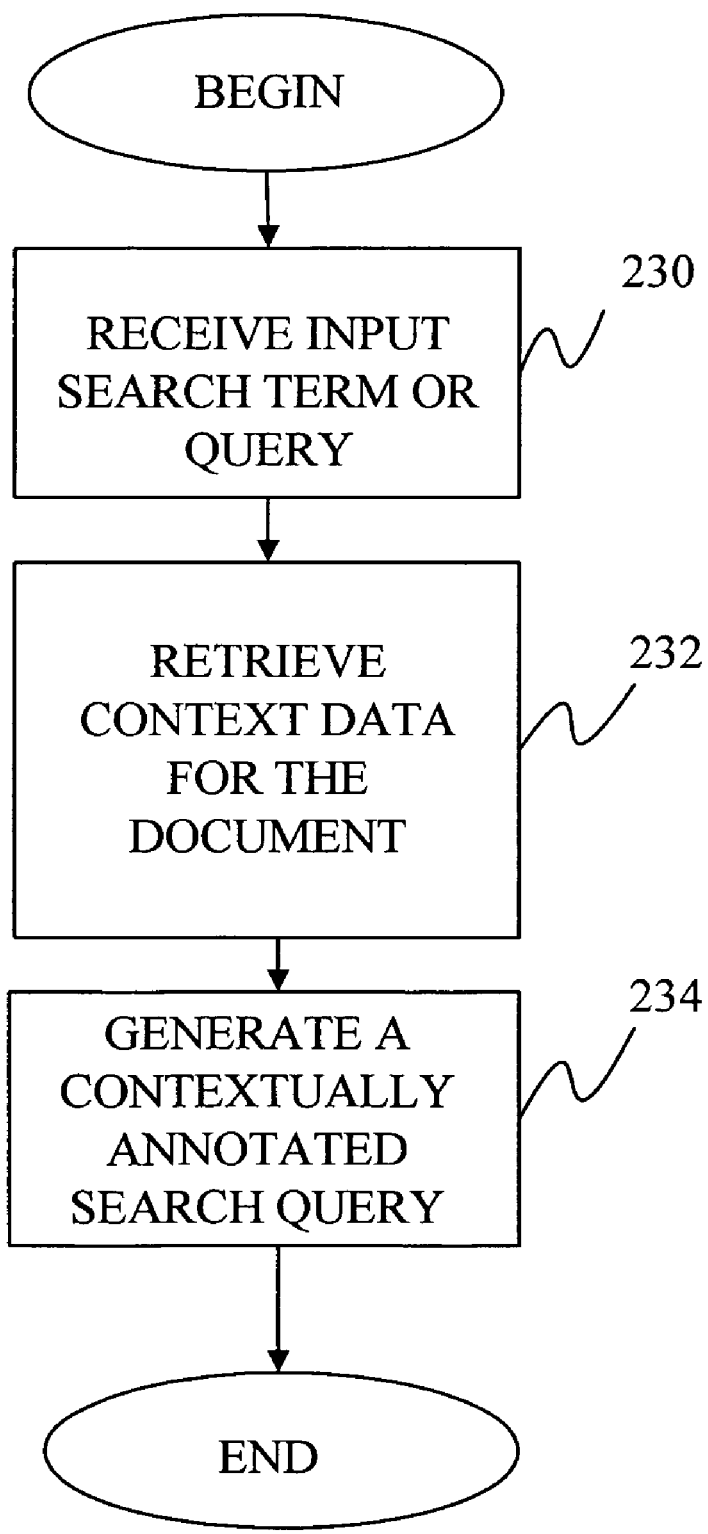
FIG. 4 is a flow chart illustrating steps for retrieving context data to generate a contextually annotated search query.

As previously described, the document context data is used to retrieve related documents through the second application component 210. Related documents similarly can be any of a web page, text document stored locally or a text document stored on another accessible computer. As shown in FIG. 4, in step 230, an input search query 216 is received. In step 232, the context data 206 is retrieved for the document and/or entities and terms extracted from the document. In step 234, the contextually annotated search query 218 is generated to retrieve additional documents and information from the document collection or web 212.

Figure 5:
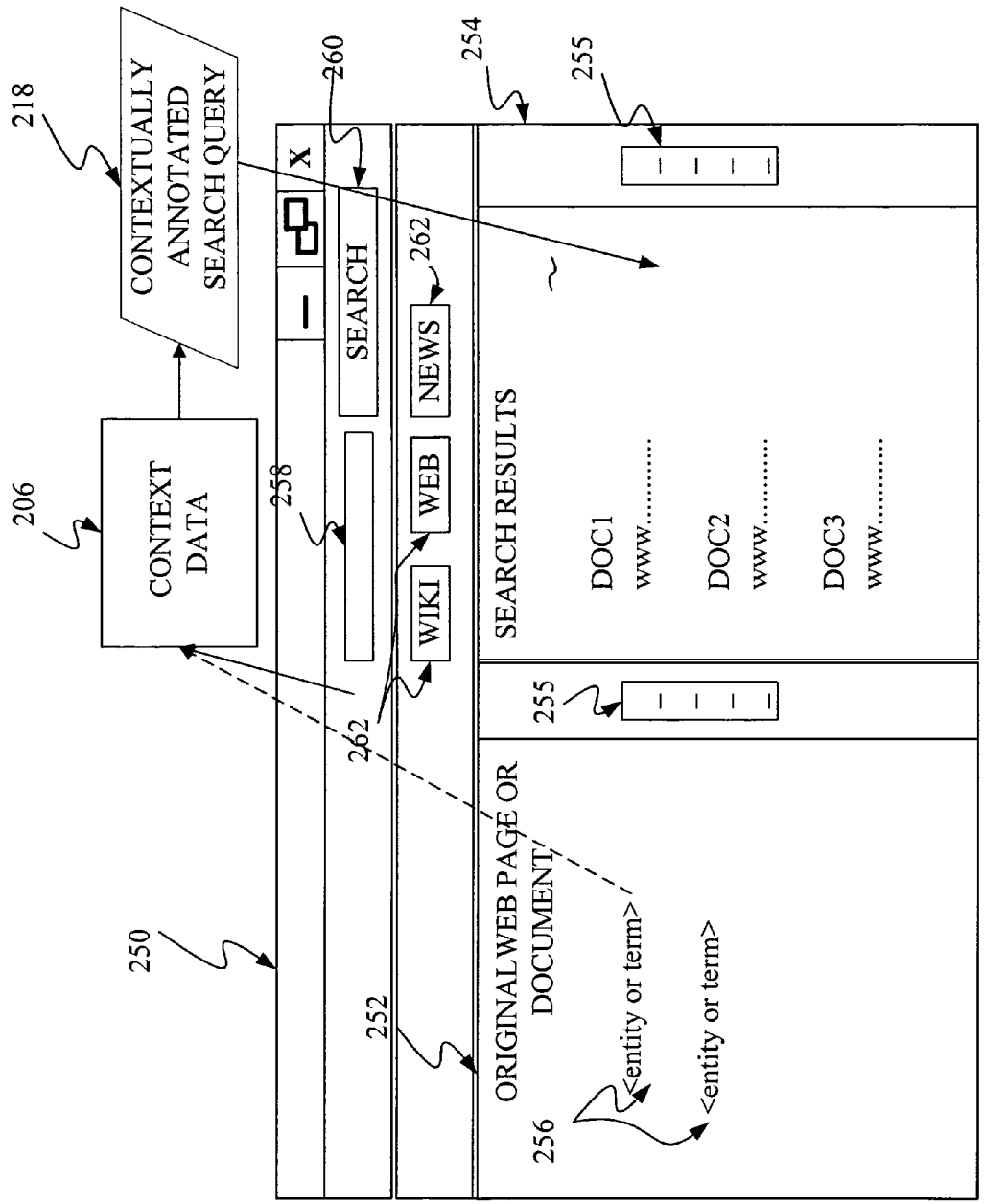
FIG. 5 is an illustration of an embodiment of a user interface for retrieving documents or information using a contextually annotated search query.

The search query generator 214 is invoked through a user interface 250 as illustrated in FIG. 5. As shown, the user interface 250 includes multiple display panels including a first display panel 252 and second display panel 254. As shown, each display panel 252, 254 includes a scroll bar 255 to scroll the display for viewing. An original document processed by the document analysis component 204 is displayed in the first panel 252. The display document includes one or more highlighted strings 256 corresponding to the extracted terms or entities. To retrieve additional documents for a particular term or entity, a user selects the desired string from the document display on the user interface through an input device, for example a pointing device 161, or other input device. Upon selection of the highlighted string 256, the search query generator 214 (shown in FIG. 2) is invoked to generate the contextually annotated search query 218 for the select entity or term based upon the context data 206. The user can also select any string in the text of the display document and use it as a query.

As shown in the illustrated embodiment, the search results for the contextually annotated search query 218 are displayed in the second display panel 254 as illustrated in FIG. 5. The context data 206 can be used to order the search results based upon relevancy to the context of the original document. In the embodiment illustrated in FIG. 5, a search query can be inputted into a text search box 258 and a search function invoked via selection of a search button 260 or other enter key. As shown, the user can select a search collection from which to retrieve documents via display keys 262. In the illustrated embodiments the display keys correspond to an encyclopedic collection (Wikipedia®), the Web and a "News" collection (Windows Live® News). Upon activation of the search function, the contextually annotated search query is generated based upon the document context from the context data 206 to retrieve documents and information based upon the context of the original document.

Figure 6:
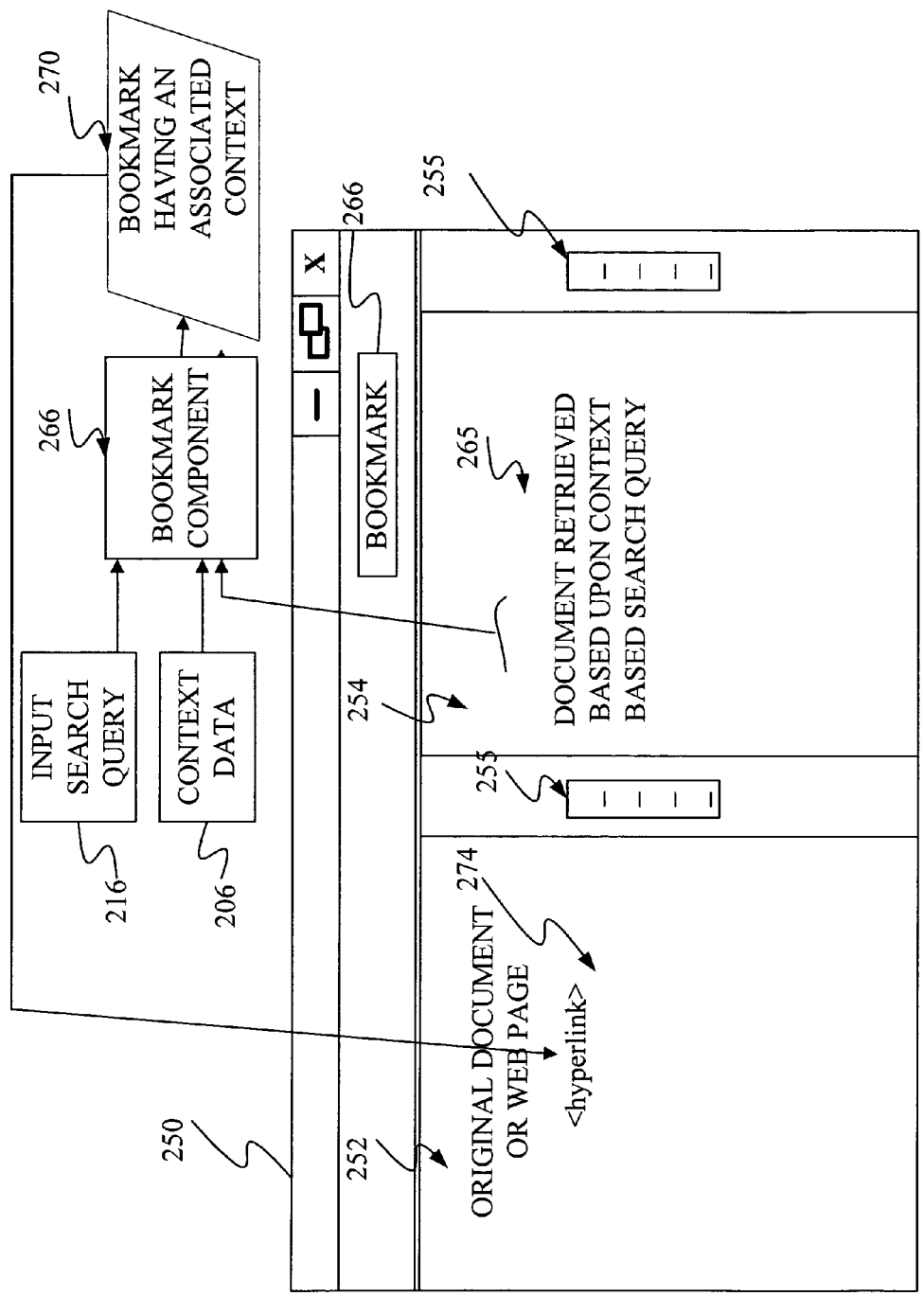
FIG. 6 is an illustration of an embodiment of a user interface to generate bookmarks having an associated context.

Upon review of the search results, a user can select a particular document for viewing in the display panel 254 as shown in FIG. 6 via an input device 161 such as a pointing device. In FIG. 6, the original document is displayed in the first display panel 252 and a retrieved document 265 is displayed in the second display panel 254. A user can create a bookmark for the retrieved document 265 by activating a bookmark function through a bookmark key 266 on the user interface 250.

Upon activation of the bookmark function, a bookmark component 266 is invoked to create a bookmark having an associated context 270. The associated context is based upon the context of the original document. As shown, the bookmark component 266 uses the input search query 216 and the context data 206 to generate the bookmark 270 for document 265. The bookmark 270 includes a document link or address for the retrieved document 265, the user search query (or the selected string from the original document), and the associated context data. If the search query appears in the original document then a hyperlink 274 is created for the bookmark document for the instances of the search query in the original document.

Figure 7:
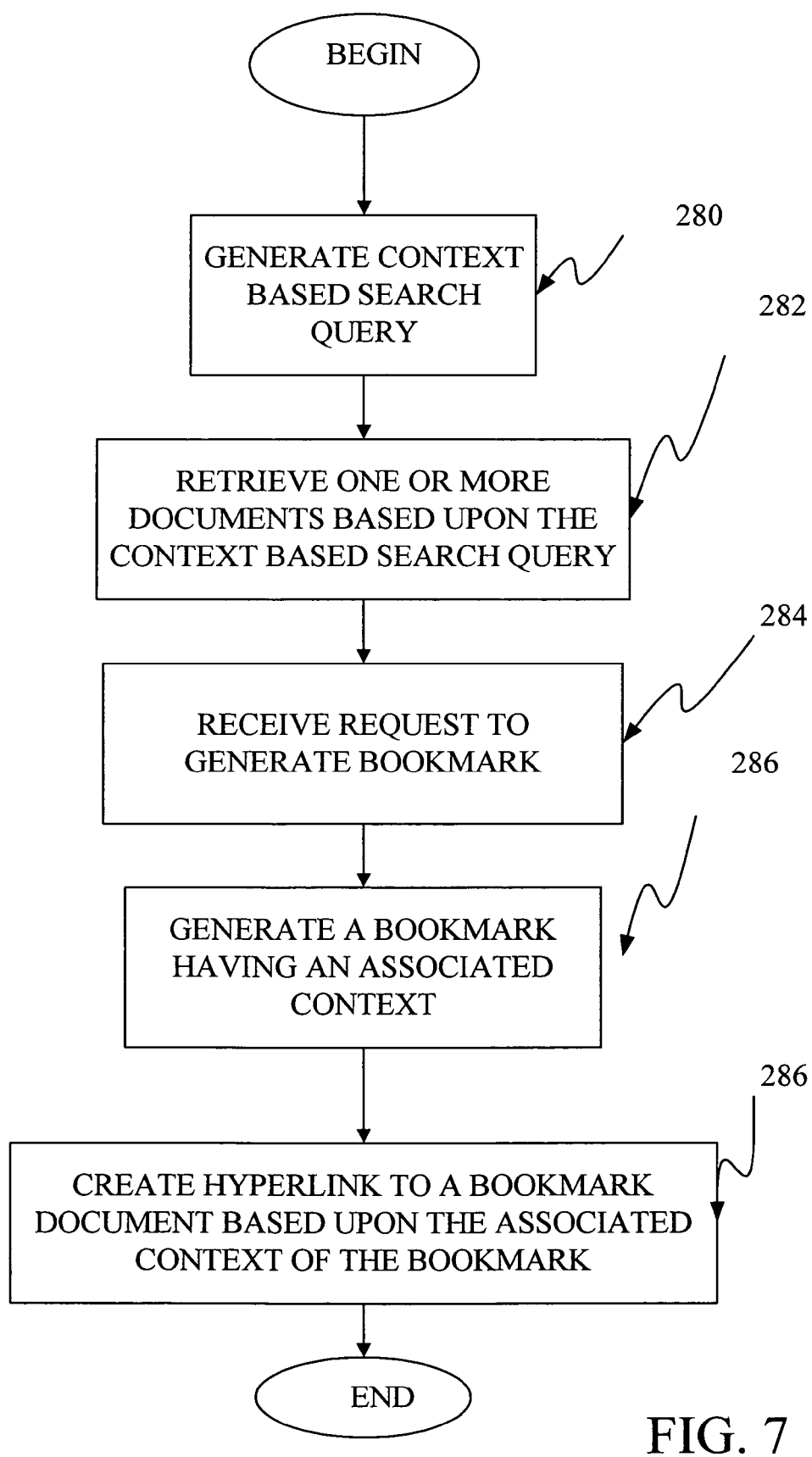
FIG. 7 is a flow chart illustrating steps for creating a bookmark and hyperlink to the bookmark document.

FIG. 7 illustrates steps for creating a bookmark with an associated context 270 as discussed in FIG. 6. As shown in step 280 of FIG. 7, a contextually annotated search query is generated for an input search query. The contextually annotated search query is used to retrieve one or more documents in step 282. In step 284, a request to create a bookmark for a document retrieved based upon the search query is received. In step 286 the bookmark is created for the retrieved document having an associated context generated based upon the search term or query context. The bookmark is used to create a hyperlink 274 in the original document or other document with a similar context with the original document to the bookmarked document for instances of the search query in the bookmark.

In an illustrated example, the user reads a document about the war in Iraq, which contains the word tactics. The user selects to retrieve additional documents or information for the term <tactics> in the original document. In response to the selection, the application creates a contextually annotated query (e.g.: "tactics+prefer:iraq+prefer:war+prefer:insurgency+prefer:us+prefer:army") and retrieves one or more documents based upon this search query. The application retrieves the top N results (for example, N=200) from the search engine, re-ranks them based on their match with the context of the original document, and presents the new sorted list of results to the user. The user can then select to create a bookmark for one or more of the retrieved documents. Upon activation of the bookmark selection, the bookmark component 266 creates the contextual bookmark 270 including a link to the selected document, the search term <tactics>, and the associated context. The bookmark can then be used to create hyperlinks in the original document or later, in other documents with similar contexts to the context of the original document, from the term <tactics> to the bookmarked document.

Figure 8:
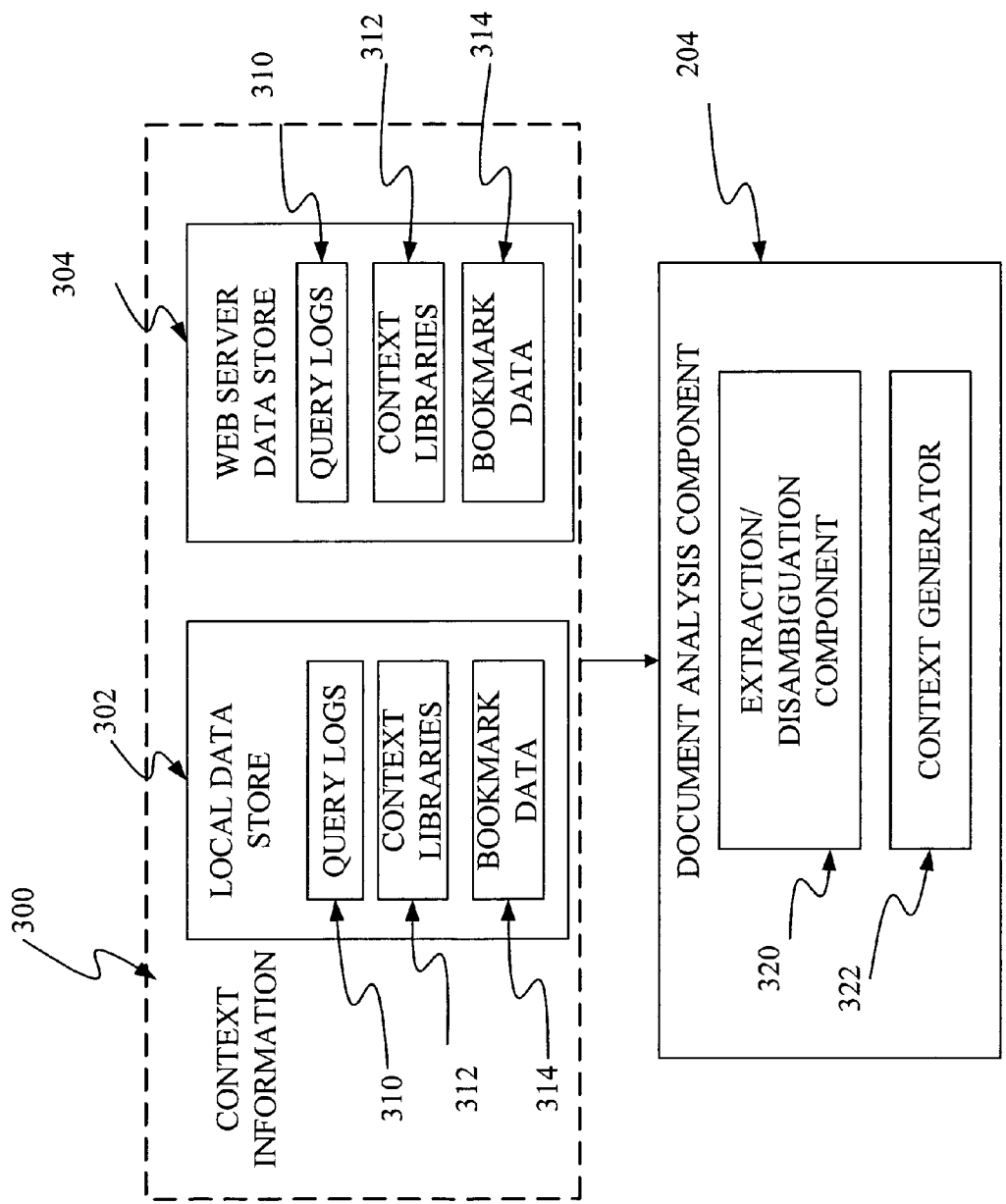
FIG. 8 is a block illustration of an embodiment of the document analysis component of FIG. 2.

As previously described, a document is processed by the document analysis component 204 to generate context data. FIG. 8 illustrates an embodiment of the document analysis component 204. As shown, the document analysis component 204 uses context information 300 available on data stores on a user's computer 302 or web server 304 to generate the context data 206. In the illustrated embodiment, the context information 300 includes query logs 310, context libraries 312 and bookmark data 314.

As shown, the document analysis component 204 includes an extraction/disambiguation component 320 and a context component 322. The extraction/disambiguation component 320 extracts entities and terms from the document and disambiguates the extracted terms and entities. For example, the component 300 uses information from query logs 310 and context libraries to disambiguate entities. The context component 322 generates context data 206 for the extracted terms or entities in the document as well as document context data generated based upon important terms and entities extracted from the document. The context data is used to retrieve documents and information related to the context of the document as previously described.

Figure 9:
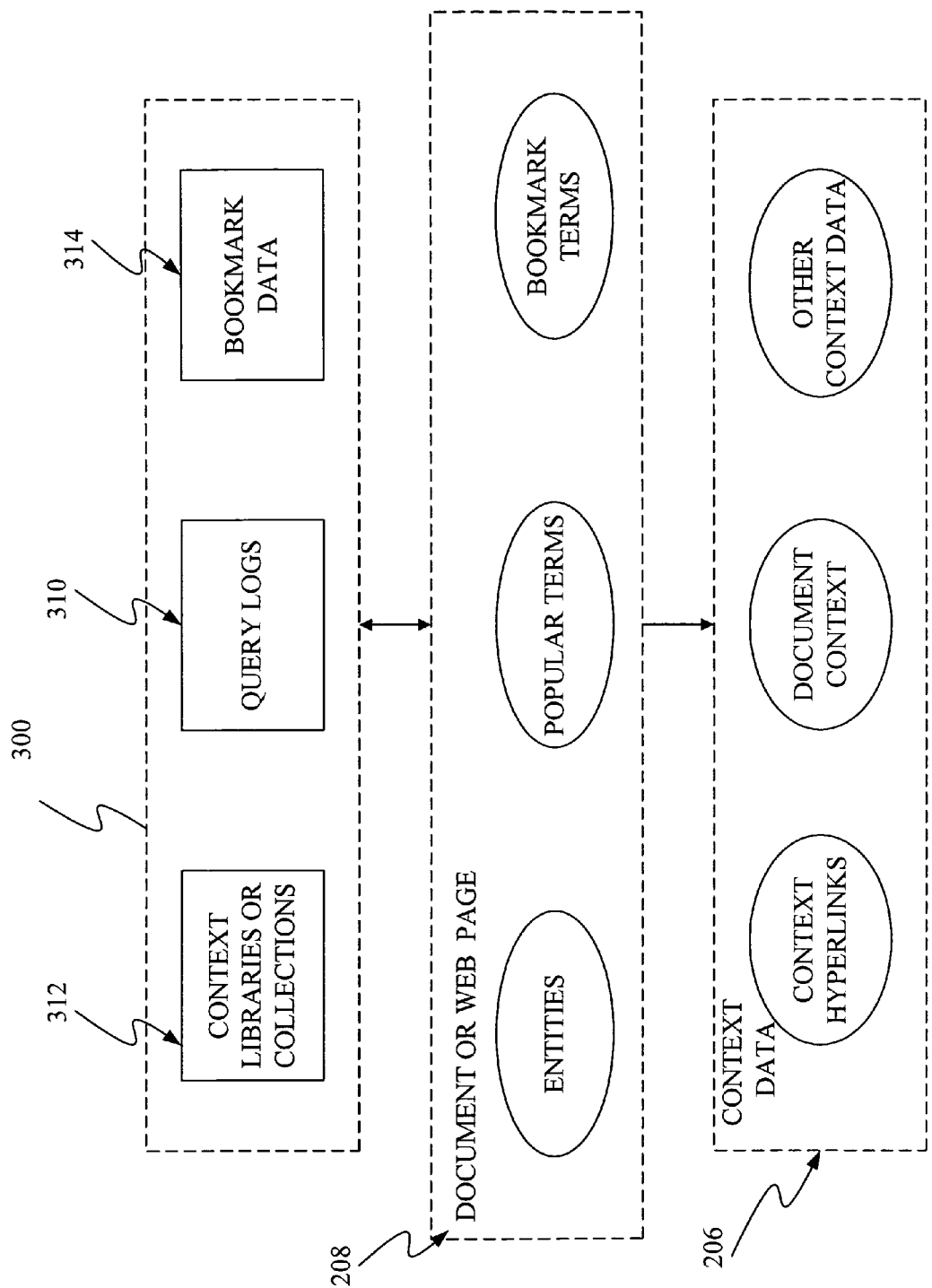
FIG. 9 is a block illustration of an embodiment for extracting entities and terms and generating context data.

In the embodiment illustrated in FIG. 9, the extraction/disambiguation component 320 extracts entities, including for example people, places and organizations, popular terms, and bookmarked terms based upon information from context libraries or collections 312. The context libraries or collections are illustratively created from on-line resources or collections, such as Wikipedia®, Encarta®, MSN® Shopping, Mappoint®, MSNBC® and Fox Sports®. Additionally, context information is populated to the context libraries based upon the bookmarks created by users in association with the context data 206 generated by the document analysis component 204.

Popular terms are extracted based upon query logs or other context data collections. The importance of a term in a document can be estimated in various ways. In one embodiment, the application estimates the term importance as follows:

Importance of a Term=TF* IDF;

where TF is the term frequency in the document; and

IDF is the inverse of the number of documents in a document set or collection that contain the term on a logarithmic scale.

The document set used for determining IDF can be specific to the type of document analyzed. For example, if the document is an article from MSNBC®, the collection can be a large set of MSNBC® articles. Alternatively, the document set used in the IDF computation can be based upon a local collection of documents on the user's computer. For example, in one embodiment, the Desktop search index on the user's computer is used to compute IDF data from term occurrence statistics in a collection of browsed documents.

The document analysis component 204 also extracts bookmark terms from bookmarked data 314 stored locally and/or on the web server 304. The bookmark data 314 can be used to create context hyperlinks. In particular, the bookmark data 314 is used to create hyperlinks in a document for terms in a document with a context similar to the associated context of the bookmark. For example, in an illustrated embodiment, the document analysis component 204 generates a hyperlink for a bookmarked term present in the input document to the bookmarked document or documents associated with that term if the context of the bookmark and the input document are sufficiently similar. This is equivalent to saying that the context of the original document in which the bookmark was created and the context of the input document are sufficiently similar.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An application for generating a search query to retrieve one or more documents relating to a context of an original document comprising:
    a first application component configured to invoke a document analysis component including instructions stored on one or more computer storage devices to generate context data for the original document stored on the one or more computer storage devices using a processing unit of a computer device;
    a second application component configured to invoke a query generator including instructions stored on the one or more computer storage devices to receive an input search query having one or more query terms and the context data and generate an annotated search query including context query terms in addition to the one or more input query terms using the context data generated by the document analysis component; and
    a bookmark component configured to generate a bookmark for one or more documents retrieved in response to the annotated search query, wherein the bookmark includes a document link or address indicative of a link between the original document and the one or more documents retrieved in response to the annotated search query.

2. The application of claim 1 wherein the document analysis component is configured to extract entities and terms from the original document and generate the context data using context information including one or more of query logs, context libraries or collections and bookmark data.

3. The application of claim 2 wherein the document analysis component is configured to disambiguate the extracted entities and terms based upon the context information.

4. The application of claim 1 wherein the query generator is invoked upon selection of a text string in the original document and is configured to generate the annotated search query using the text string as the input search query.

5. The application of claim 1 wherein the query generator is invoked through a user interface and the search query is inputted in a text box or input field of the user interface.

6. The application of claim 1 wherein the bookmark generated for the one or more documents retrieved in response to the annotated search query includes one or more terms of the input search query and the context data.

7. The application of claim 6 wherein the document analysis component is configured to generate a hyperlink for a term or entity in the original document to the one or more bookmarked documents retrieved in response to the annotated search query.

8. The application of claim 1 wherein the search query generator is invoked through a user interface and the user interface includes multiple display panels to display the original document processed by the document analysis component and one or more documents retrieved using the annotated search query.

9. The application of claim 1 wherein the document analysis component is configured to extract terms and entities in the original document and use context information on a web server to generate the context data for the original document.

10. A method comprising:
    receiving a user input query from a graphical user interface component including one or more query terms;
    generating context data related to a context of an original document relating to the user input query using instructions stored on one or more computer storage devices;
    annotating the input query to add one or more contextual terms to the one or more query terms using the context data generated for the original document to provide an annotated search query;
    executing the annotated search query and retrieving one or more documents from a document collection in response to the annotated search query using the contextual terms generated based upon the context of the original documents; and
    simultaneously displaying, in a user interface, the original document and the one or more documents retrieved in response to the annotated search query, wherein the original document is displayed in a first user interface panel or portion of the user interface and the one or more documents retrieved in response to the annotated search query are displayed in a second user interface panel or portion of the user interface.

11. The method of claim 10 and further comprising:
    generating one or more hyperlinks in the original document to the one or more documents retrieved in response to the annotated search query.

12. The method of claim 10 wherein generating the context data comprises:
    extracting entities and terms from the document; and
    using context information and the extracted entities and terms to generate the context data.

13. A method comprising:
receiving an input search query including one or more query terms through a graphical user interface;
annotating the input search query to add one or more context terms for an original document or web page, the context terms being generated from one or more of document or web page terms or entities, query logs or bookmark or context data stored on one or more computer storage devices;
executing the annotated input search query to retrieve one or more documents using the annotated search query; and
generating a bookmark for the one or more retrieved documents, wherein the bookmark includes a document link or address linking the one or more retrieved documents and the original document or web page, and wherein the bookmark includes one or more of the input query terms, and wherein the bookmark includes one or more context terms generated from the one or more of the document or web page terms or entities, the query logs or the bookmark or context data.

14. The method of claim 13 and further comprising:
creating a hyperlink in a document to a bookmarked document for one or more terms in the document related to the one or more query terms associated with the bookmarked document.

15. The method of claim 13 and further comprising:
storing the bookmark in a data store of bookmarks; and
retrieving the bookmark to create a hyperlink in another document based upon the similarity of the context of the other document to the context associated with the bookmark.

16. An application comprising instructions stored on one or more computer storage devices and executed by a processing unit to implement the method of claim 13.

17. The method of claim 10 and comprising:
providing an input field or box on the graphical user interface; and
processing input terms in the input field or box to provide the user input query.

18. The method of claim 10 and comprising:
receiving a selection of a text or highlighted string from the graphical user interface; and
processing the selected text or highlighted string to provide the user input search query.

19. The method of claim 13 wherein the input search query is related to a document on a graphical user interface display and comprising:
receiving an input selection of a text string from the document; and
processing the input selection of the text string to generate the one or more query terms of the input search query.

20. The method of claim 10 and comprising:
providing, in the user interface, a user-selectable control for a bookmark function; and
in response to a user selecting the control, implementing the bookmark function to generate a bookmark for the one or more documents retrieved in response to the annotated search query, wherein the bookmark includes a document link or address indicative of a link between the original document and the one or more documents retrieved in response to the annotated search query.

* * * * *